United States Patent [19]

Noda et al.

[11] Patent Number: 6,007,301

[45] Date of Patent: Dec. 28, 1999

[54] TIAL TURBINE ROTOR AND METHOD OF MANUFACTURING

[75] Inventors: Toshiharu Noda, Tajimi; Michio Okabe, Chita; Takao Shimizu, Nagoya, all of Japan

[73] Assignee: Diado Steel Co., Ltd., Nagoya, Japan

[21] Appl. No.: 08/953,249

[22] Filed: Oct. 17, 1997

[30] Foreign Application Priority Data

| Oct. 18, 1996 | [JP] | Japan | 8-311143 |
| Dec. 27, 1996 | [JP] | Japan | 8-359854 |
| Feb. 12, 1997 | [JP] | Japan | 9-027630 |

[51] Int. Cl.$^6$ ........................... B63H 1/28
[52] U.S. Cl. ............... 416/213 R; 416/241 R; 416/244 A
[58] Field of Search ............ 416/213 A, 213 R, 416/241 B, 241 R, 244 A, 244 R; 228/263.43, 263.72; 29/889, 889.2; 420/418, 420, 421; 148/421

[56] References Cited

U.S. PATENT DOCUMENTS

| 4,659,245 | 4/1987 | Hirao et al. | 403/30 |
| 4,719,074 | 1/1988 | Tsuno et al. | 419/5 |
| 5,064,112 | 11/1991 | Isobe et al. | 228/112 |
| 5,193,607 | 3/1993 | Demukai et al. | 164/493 |
| 5,196,162 | 3/1993 | Maki et al. | 420/418 |

*Primary Examiner*—Edward K. Look
*Assistant Examiner*—Ninh Nguyen
*Attorney, Agent, or Firm*—Varndell & Varndell, PLLC

[57] ABSTRACT

A turbine rotor consisting of a wheel made of a TiAl alloy of good heat resistance and a rotor shaft made of a steel with good bonding strength is disclosed. As the shaft material a structural steel or a martensitic heat resistant steel is used. A TiAl turbine wheel made by precision casting is butted to the shaft with insertion of a brazing filler in the butted interfaces and stress of 0.01 kgf/mm$^2$ or higher but lower than yield stress of the shaft is applied on the butted interfaces under heating by high frequency induction heating in atmosphere of an inert gas or a reducing gas to a temperature higher than the liquidus temperature of the brazing metal but not exceeding 100° C. above the liquidus temperature. Turbine rotors with good accordance of the axes of the wheel and the shaft will be obtained by fitting a projection (or recess) and a recess (or projection) formed at the base of the wheel and the end of the shaft concentrically to the outer shape thereof, and by brazing the ring-shaped area outside the fitted parts.

20 Claims, 4 Drawing Sheets

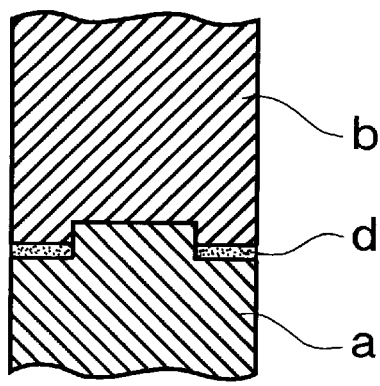
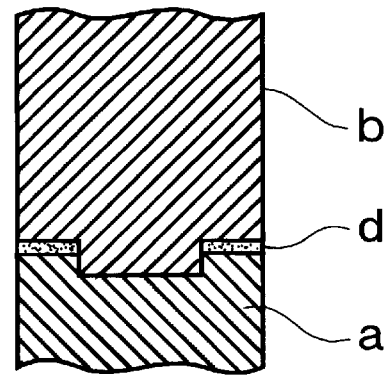
FIG. 5　　　　　FIG. 6
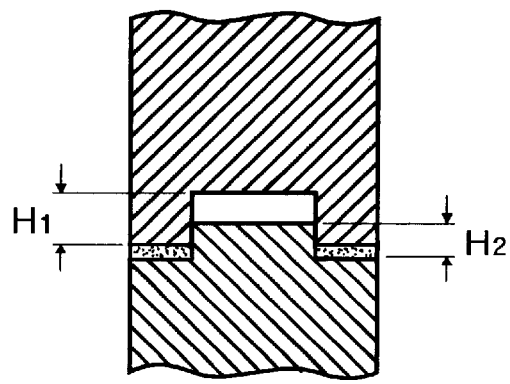
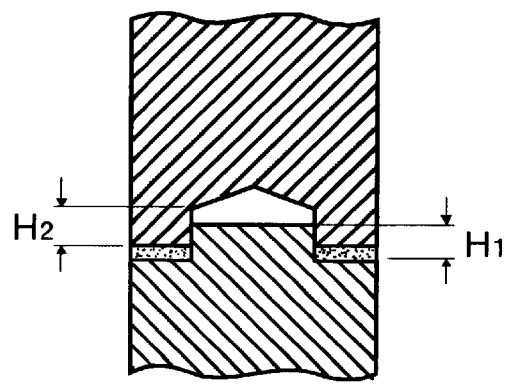
FIG. 7　　　　　FIG. 8

TIAL TURBINE ROTOR AND METHOD OF MANUFACTURING

BACKGROUND OF THE INVENTION

1. Field in the Industry

The present invention concerns a TiAl turbine rotor used as a part of turbochargers for internal combustion engines, and a method of manufacturing the same.

2. State of the Art

To date, turbine rotors for turbochargers of internal combustion engines have been manufactured by bonding a shaft made of a structural steel to a turbine wheel made by precision casting of, for example, Ni-based super alloy Inconel 713° C. having good high temperature strength by friction bonding or electron beam bonding.

For the purpose of improving heat resistance of the turbochargers and to enhance responsibility of engines by lowering inertia caused by lowered weight of the turbine wheels, ceramics turbine rotors made of silicon nitride have been practiced.

The ceramics turbine rotors have drawbacks such as, 1) that the wheels must be thicker than those of conventional metal products due to lower rigidity of the material; and 2) that balance of thermal expansion between the wheel and the casing is difficult to achieve due to lower thermal expansion of ceramics.

As a new material to replace ceramics, TiAl alloys drew attention because of their such low specific gravity as 3.8, which is of the same level as those of ceramics, a high specific strength (strength by density) at high temperature, which is equal to or higher than that of Inconel 713° C., and a thermal expansion coefficient near those of metals. Thus, it was proposed to use the TiAl alloys as the material for turbine wheels (for example, Japanese Patent Disclosure No. 61-229901). The TiAl alloys practically used are those containing TiAl intermetallic compound as the main component, and the alloy compositions vary in a certain range. In the following description, however, the alloys are collectively referred to as "TiAl".

The TiAl turbine wheels are made by precision casting or isothermal forging and then, bonded to shafts made of a structural steel to form the turbine rotors. For the way of friction bonding, which has been practiced for bonding wheels of conventional Ni-based superalloy and shafts of a structural steel, cannot be applied to bonding TiAl wheels. This is because, if friction bonding is employed, transformation of the structural steel at the time of cooling from austenite to martensite causes volume expansion of the steel, which results in residual stress, and even though the TiAl have much higher rigidity which ceramics lack, ductility at room temperature is so low as about 1%, and thus, cracking of the TiAl wheels may occur. Further, reaction of Ti in TiAl and C in the structural steel occurs to form titanium carbide at the bonding interface, and therefore, strength at the interface decreases.

As the solutions of these problems, there has been proposed to practice vacuum brazing or friction bonding using an intermediate parts of austenitic material which does not suffer from martensitic transformation (for example, Japanese Patent Disclosure No. 02-133183).

The former solution, vacuum brazing mentioned above, must be carried out in high vacuum, which necessitates longer operation period inclusive of vacuum evacuation, and the costs will be higher. The latter solution, use of intermediate parts, requires two stages of bonding, for example, the first bonding between the intermediate part and the shaft and the second bonding between the intermediate part and the turbine wheel. Thus, the costs for manufacturing are also high. Further, control of the intermediate thickness after bonding is difficult.

The shaft part of the turbine rotor made by bonding is subjected to, for the purpose of refining, hardening and tempering, and then, the surface of the shaft around the bonded part to be supported by bearings is subjected to, for the purpose of improving wear resistance, hardening by high HF-heating or by laser heating. In case of vacuum brazing, if the austenitizing temperature is above the melting point of the brazing metal, then the brazing metal melts again at heating for hardening. This will result in oxidation of the brazing metal and decrease of strength at the bonded part. In some cases the product rotors may be even destroyed during handling.

Under the above circumstances, TiAl turbine rotors have not been practically manufactured. Main bar to practical manufacturing is high cost of production. The inventors tried brazing under high frequency induction heating (hereinafter abbreviated as "HF-heating"). The trial succeeded and it was ascertained that TiAl turbine wheels and steel shafts can be bonded with high bonding strength and that TiAl turbine rotors can be manufactured with reduced costs.

In practice of the above technology it was experienced that, if the interfaces to be bonded by brazing are plane, placing the axis of the TiAl wheel and the axis of the shaft in accordance is difficult, and that eccentric bonding often occurred. Also, due to higher thermal conductivity of TiAl, conduction of heat from the TiAl wheel, which is exposed to a high temperature during use, to the shaft is so high that the shaft goes to a high temperature and as the result, seizure of bearings may occur.

SUMMARY OF THE INVENTION

A basic object of the present invention is, therefore, to provide a TiAl turbine rotor and a method of manufacturing the TiAl turbine rotor, which solves the problems in vacuum brazing that the operation period is long and that costs are high, and is suitable for reduction in industrial scale.

Another object of the present invention is to provide a TiAl turbine rotor, in which the axis of the TiAl wheel and the axis of the shaft are in good accordance, as well as a method of manufacturing the rotor.

Further object of the present invention is to provide a TiAl turbine rotor, in which, in addition to the above mentioned good accordance in the axis of the TiAl wheel and the axis of the shaft, conduction of heat from the wheel to the shaft is decreased, as well as a method of manufacturing the rotor.

BRIEF EXPLANATION OF THE DRAWINGS

FIG. 5 illustrates the bonded parts in the stage subsequent to the stage of FIG. 4;

FIG. 6 illustrates an embodiment of the bonded parts other than that of FIG. 5;

FIG. 7 and FIG. 8 both illustrate further embodiments of the bonded parts; and

DETAILED EXPLANATION OF THE PREFERRED EMBODIMENTS

Figure 1:
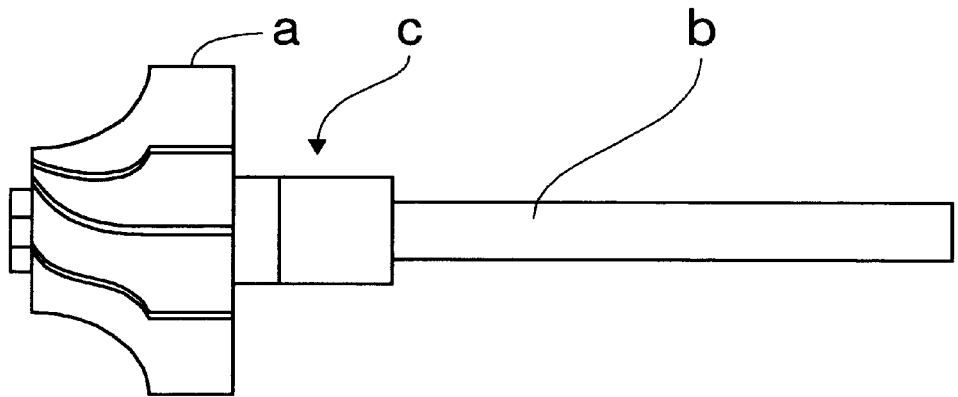
FIG. 1 is a side view of a TiAl turbine rotor according to the present invention.

The TiAl turbine rotor according to the present invention is, in a basic embodiment shown in FIG. 1, a TiAl turbine rotor consisting of a TiAl turbine wheel a made by precision casting and a rotor shaft b bonded thereto, characterized in that a structural steel or a martensitic heat resistant steel is used as the material for the shaft, and that the base of the wheel and the end of the shaft are bonded at the bonding interface by brazing with a brazing filler d.

The method of manufacturing the above TiAl turbine rotor according to the present invention is characterized in that a brazing filler d is inserted between a TiAl turbine wheel a made by precision casting and a rotor shaft b of a structural steel or a martensitic heat resistant steel; that stress of 0.01 kgf/mm$^2$ or higher but lower than yield stress of the shaft and the rotor wheel at the bonding temperature is applied on the interfaces; that heat is given to the parts to be bonded by HF-heating in atmosphere of an inert gas or a reducing gas to a temperature higher than the liquidus temperature of the brazing metal but not exceeding 100° C. above the liquidus temperature; and that the parts are maintained at the heated temperature and then cooled to carry out bonding by brazing.

Figure 2:
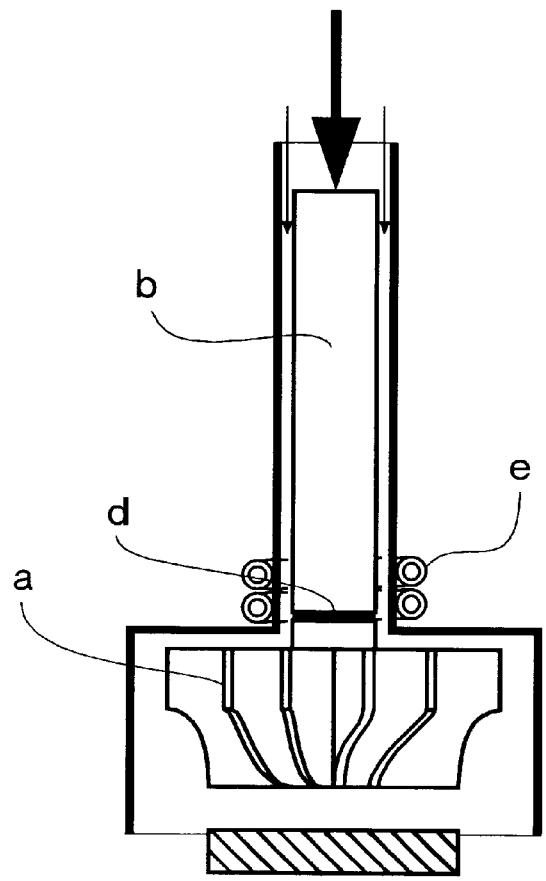
FIG. 2 is a longitudinal cross section view of a HF-heating device illustrating the basic embodiment of manufacturing the TiAl turbine rotor.
Figure 3:
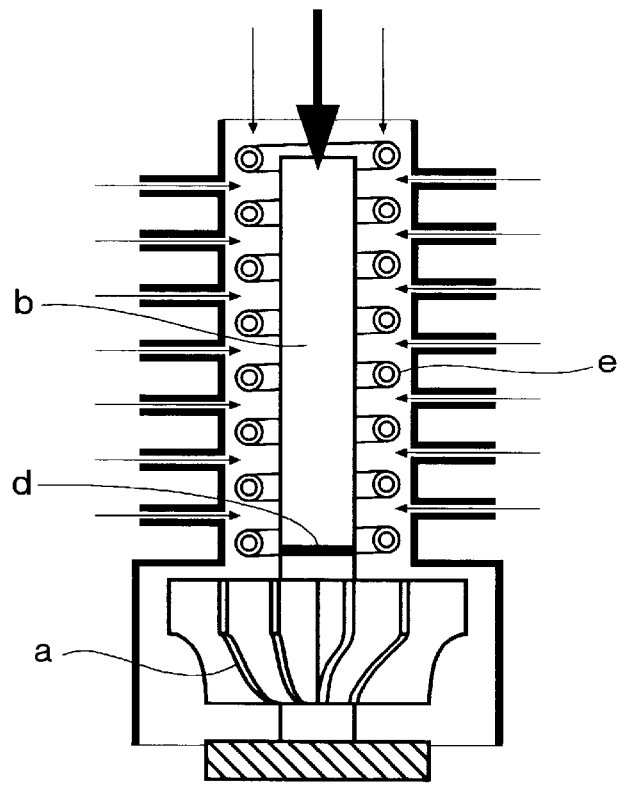
FIG. 3 is also a longitudinal cross section view of a HF-heating device illustrating the preferred embodiment of manufacturing the TiAl turbine rotor.

It is advantageous to realize hardening at the same time of bonding. For this purpose, though HF-heating for brazing may be done, as shown in FIG. 2, only for the part of bonding, it is recommended to carry out brazing, as shown in FIG. 3, by heating both the turbine wheel and the shaft in a heating device which is under non-oxidizing atmosphere by HF-heating to a temperature above the austenitizing temperature, and thereafter, by blasting cooling gas such as argon or helium, or jetting a cooling liquid such as water to quench the shaft to harden it.

If wettability of the interfaces between the brazing metal and the parts to be bonded decreases due to oxidation during heating, unbonded area will increase and the increase will result in decreased bonding strength. Therefore, it is necessary or advantageous to envelop the TiAl turbine wheel and the rotor shaft with a heat resistant glass cover, as shown in FIG. 2 and FIG. 3, and to supply an inert gas or reducing gas in the cover around these parts so that oxidation may be prevented. In case where the brazing metal used contains an active metal component, it is preferable to supply a reducing gas (e.g., He gas containing 5% H$_2$).

Period of time necessary for brazing is short. It was found that, under ordinary brazing conditions, maintaining under heating for 30 seconds will give satisfactory bonding strength. For example, in case of the shaft diameter 17 mm, total operation period inclusive of preparation for heating took such a short time as about 90 seconds In case where the shaft material is subjected to hardening and tempering after bonding, in order to prevent remelting of the brazing metal at the bonded interface during heating for hardening of the shaft material, it is necessary to choose such brazing metal and the shaft material that the liquidus temperature of the brazing metal is higher than the austenitizing temperature of the shaft In practice, liquidus temperature of the brazing metal after bonding will be higher than the original liquidus temperature of the brazing metal due to diffusion of different elements from the jointed parts during bonding, and therefore, it is possible to choose such combination that the liquidus temperature is equal to the austenitizing temperature of the shaft material. Too high a temperature of brazing may cause chemical reactions between the parts to be bonded and the brazing metal to form compounds at the bonding interfaces, and this may result in decreased strength at the part of bonding. In order to avoid this the temperature should be up to 100° C. above the liquidus temperature of the brazing metal.

The turbine rotors according to the present invention are, in many cases, subjected to hardening and tempering of the shaft and machining followed by surface hardening treatment before use of the product.

Figure 4:
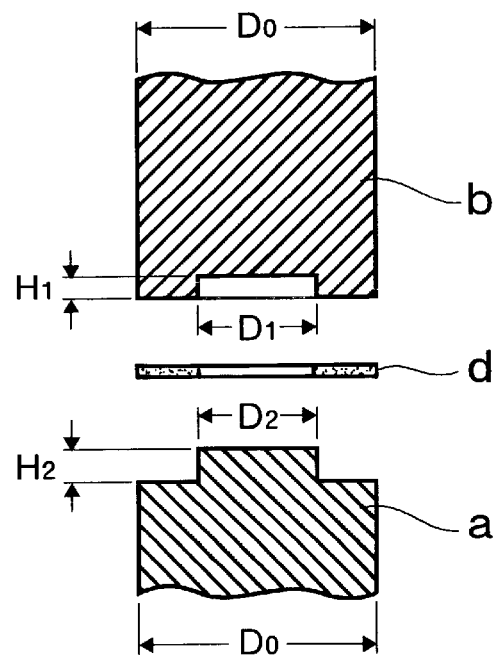
FIG. 4 is a longitudinal section view of the wheel base and the shaft end of the TiAl turbine rotor in the stage prior to bonding.

The advanced and preferable embodiment of the TiAl turbine rotor of the invention is a TiAl turbine rotor consisting of a TiAl turbine wheel made by precision casting and a rotor shaft bonded thereto, characterized in that a structural steel or a martensitic heat resistant steel is used as the material for the shaft, that, as shown in FIG. 4 and FIG. 5 or FIG. 6, a recess (or a projection) and a projection (or a recess) are provided concentrically at the base of the wheel and the end of the shaft, and that the recess and projection are fitted and the ring-shaped part outside the recess and the projection are bonded by brazing.

The example shown in FIG. 4 and FIG. 5 is of a case where the base of wheel has a projection and the end of the shaft has a recess, while the other example shown in FIG. 6 is of a reversal case, i.e., where the base of wheel has a recess and the end of the shaft has a projection.

Because turbine rotors are used at a high temperature and under high speed rotation, the material thereof should have good high temperature strength and ductility as well as oxidation resistance. From this point of view, TiAl should have a basic alloy composition in which Al shares 31–35% and the balance is substantially Ti. Preferably, the alloy contains one or more of the following additional element or elements:

1) at least one of Cr, Mn and V in an amount of (in case of two or more, in total) 0.2–4.0 wt. %;
2) at least one of Nb, Ta and W in an amount of (in case of two or more, in total) 0.2–8.0 wt. %; and
3) Si of 0.01–1.00 wt. %.

Impurities are preferably restricted to be as follows:

4) Zr: less than 1.0%, Fe: less than 1.0%, C: less than 0.2%, O: less than 0.2% and N: less than 0.2%.

The following explains the reasons of restricting the compositions of the TiAl alloys used as the material of turbine wheels in the present invention as noted above:

Al: 31–35%

Aluminum couples with titanium to form intermetallic compounds, TiAl and Ti$_3$Al. Single phases of both TiAl and Ti$_3$Al are brittle and of low strength. However, in case where Al is in the range of 31–35%, Ti$_3$Al may be contained in TiAl in a volume percentage of 5–30%, and forms a two phase alloy, which exhibits good ductility and strength. In case of a lower Al-content less than 31% much Ti$_3$Al forms, while in case of a higher Al-content more than 35% too small amount of Ti$_3$Al forms, and in both the cases strength and ductility of the alloy will be damaged One or more of Cr, Mn and V: 0.2–4.0% (in case of tow or more, in total)

All of Cr, Mn and V are the elements which improve ductility of TiAl. These elements give the ductility improving effect when added in total amount of 0.2% or higher. Such a large amount of addition as more than 4% results in remarkable decrease in oxidation resistance, and at the same time, causes β-phase formation, which results in decreased high temperature strength. One or more of Nb, Ta and W: 0.2–8.0% (in case of tow or more, in total)

Nb, Ta and W improve oxidation resistance of TiAl. The effect can be obtained by addition of these elements in an amount of 0.2% or higher. Addition amount exceeding 8% will decrease the ductility. Also, such a large amount of addition may increase density of the TiAl, in other words, a characteristic merit of this alloy, low density, will be weakened.

Si: 0.01–1.00%

Si reacts Ti to form silicide ($Ti_5Si_3$) and improves creep resistance and oxidation resistance of TiAl. This effect can be appreciated when added in an amount of at least 0.01% of Si. Addition of 1% or higher will decrease ductility of the alloy.

Zr:<1.0%, Fe:<1.0%, C:<0.2%, O:<0.2% and N:<0.2%.

Zr, Fe, C, O and N are impurities coming into the product from the materials or at precision casting of TiAl rotor wheels. If these impurities exist in a large amounts, ductility of TiAl will significantly decrease. Thus, the upper limits of these elements are set to be 1.0%, 1.0%, 0.2%, 0.2% and 0.2%, respectively.

The TiAl turbine wheel which is a part of a turbine rotor may be produced by either precision casting or constant temperature forging. Ductility of the TiAl turbine wheels may be improved by heat treatment at a temperature in the range of 1200–1300° C. Also, strength and ductility of the precision cast products may be improved by HIP treatment at a temperature of 1200–1350° C. under a pressure of 1000 $kgf/cm^2$ or higher so as to smash internal defects and thus improving liability, strength and ductility.

In bonding by brazing, in case where projection and recess are formed at the base of the wheel and the end of the shaft, it will be convenient to use a brazing filler in the form of a punched ring foil corresponding to the shape and size of the ring-shaped area outside the projection and the recess.

Higher stress will improve wettability of the interfaces between the brazing filler and the parts to be bonded and cause invasion of the melted brazing metal into the interface of fitting, which will result in substantial increase of bonded area and increased bonding strength. In case where surfaces to be bonded are rough, higher stress will be preferable.

As the brazing filler products of various brazing metals may be used. Among them, those containing Ag, Cu, Ni or Ti as the main components and having a melting temperature of 800° C. or higher can be preferably used.

It is preferable that there is some difference in the diameters of the projection and the recess at the bonding part to realize clearance fitting, because, if the difference is substantially zero, then interference fitting is forcible and fitting will be difficult to achieve. Clearance fitting enables invasion of melted brazing metal into the clearance at brazing, and increased bonding strength can be expected. However, from the view to braze the parts under good accordance in the axes of the wheel and the shaft, clearance should not be too large. Usually, a clearance up to 1 mm will cause no problem.

Areal ratio of the projection/recess part to the ring-shaped part is preferably so chosen that the ring-shaped area may share 20% or more of whole the cross section. This ratio will give sufficient bonding strength.

Combination of a larger depth of the recess and a smaller height of the projection forms a cavity in the bonded part. The cavity will prevent thermal conduction from the wheel to the shaft and thus, temperature increase in the shaft will be suppressed. This is desirable from the view point of protection of bearings. The length of the cavity is of course determined by the difference between the depth of the recess and the height of the projection, and usually, length of a few to 15 mm is suitable. Profiles of the cavity may vary. Not only the simple profile as shown in FIG. 7 but also the profile of conical bottom as shown in FIG. 8 may be used. An alternative having conical recess at the top of the projection may be of course used.

The present invention thus provides a TiAl turbine rotor in which a turbine wheel made of TiAl having good heat resistance and a shaft made of a structural steel or a heat resistant steel are bonded with high bonding strength. A preferred embodiment of the invention provides better TiAl turbine rotors, in which the axes of the turbine wheel and the shaft are in good accordance. Another preferred embodiment provide better products, in which, in addition to the above merit, heat conduction from the wheel to the shaft is smaller and thus temperature increase in the shaft is decreased.

EXAMPLES

Example 1

TiAl turbine wheels of a diameter 52 mm were prepared using two kinds of TiAl alloys shown in Table 1 by precision casting. Shafts were made of two kinds of steel rods having a diameter $D_0$=17 mm and length 110 mm. The steels are of the compositions shown in Table 1. Brazing fillers used were three as also shown in Table 1

TABLE 1

| Reference | Kind | Chemical Composition | or Standard |
|---|---|---|---|
| TiAl Turbine Wheel | | | |
| 33.5Al | | Ti—33.5Al—4.8Nb—1.0Cr—0.2Si | |
| 34.0Al | | Ti—34.0Al—5.0Nb—1.0Cr—0.2Si | |
| Shaft Material | | | |
| SNCM439 | Ni—Cr—Mo Structural Steel | | JIS G 4103 |
| SUH11 | Martensitic Heat Resistant Steel | | JIS G 4311 |
| Brazing Filler | | | |
| BAg-7, 13A | Silver-Based | 63Ag—33Cu—Ti | JIS Z 3261 |
| BNi-3 | Nickel-Based | — —Ni | JIS Z 3265 |
| "A" | Silver-Based | Ag—35.5Cu—1.7Ti | |
| "B" | Copper-Based | Cu-1-Co—31.5Mn | |
| "C" | Titanium Based | Ti—15Ni—15Cu | |

As shown in FIG. 2, a brazing filler (d) was inserted between a wheel (a) and a shaft (b) and a pressure of 0.5 $kgf/mm^2$ was posed on the interface. The surfaces bonded were plane and finished by abrasion. As the brazing filler metal foils of 50 μm thick were used. The parts to be bonded were covered by a heat resistant glass cover to protect the parts to be bonded and argon gas was supplied in the space of the glass cover. HF-heating was carried out by using a heating coil provided outside the cover glass to heat the parts to be bonded to the temperature of liquidus temperature of the brazing metal +50° C. Heating was continued for 30 seconds after the temperature reached to the above level, and then electric power was cut off to cool the bonded product. The combination of the TiAl wheels, shafts and brazing filler are listed in Table 2. Liquidus temperatures of the brazing filler and austenitizing temperatures of the shaft are alloshown in Table 2.

TABLE 2

| Run No. | Material of TiAl Wheel | Brazing Grade | Metal Liquidus Temp.(° C.) | Shaft Steel Code | Material Austenitizing Temp. (° C.) |
| --- | --- | --- | --- | --- | --- |
| Invention | | | | | |
| 1 | 33.5Al | BAg—13A | 893° C. | SNCM439 | 750° C. |
| 2 | 33.5Al | A | 820° C. | SNCM439 | 750° C. |
| 3 | 33.5Al | B | 1000° C. | SNCM439 | 750° C. |
| 4 | 33.5Al | C | 960° C. | SNCM439 | 750° C. |
| 5 | 33.5Al | BNi-3 | 1040° C. | SNCM439 | 750° C. |
| 6 | 34.0Al | BNi-3 | 1040° C. | SUH11 | 850° C. |
| Control Example | | | | | |
| 1 | 33.5Al | BAg-7 | 650° C. | SNCM439 | 750° C. |
| 2 | 34.0Al | BAg-7 | 650° C. | SUH11 | 850° C. |
| 3 | 34.0Al | A | 820° C. | SUH11 | 850° C. |

The periods of time necessary from the beginning of heating to the completion of brazing were so short as up to 90 seconds, even in the longest case with the highest heating temperature. Half of the turbine rotors thus made were subjected to torsion test at room temperature as bonded and the rest were subjected to the test after being hardened and tempered under the conditions shown in Table 3. The hardening and tempering were carried out in accordance with the indication by JIS G 4103 and 4311. Both the samples were finished by machining to have a diameter 16 mm at the bonded parts prior to the test. The test results are shown in Table 3 with the conditions of hardening and tempering of the bonded products.

TABLE 3

| No. | Hardening-Tempering Condition | Torsion Breaking Torque (kgf•m) As Bonded | As Hardened |
| --- | --- | --- | --- |
| Invention | | | |
| 1 | 820° C./0.5 hr/OQ + 600° C./1 hr/WC | 12.1 | 11.3 |
| 2 | 820° C./0.5 hr/OQ + 600° C./1 hr/WC | 14.9 | 15.0 |
| 3 | 820° C./0.5 hr/OQ + 600° C./1 hr/WC | 12.7 | 12.5 |
| 4 | 820° C./0.5 hr/OQ + 600° C./1 hr/WC | 13.9 | 13.1 |
| 5 | 820° C./0.5 hr/OQ + 600° C./1 hr/WC | 17.5 | 17.1 |
| 6 | 1000° C./0.5 hr/OQ + 600° C./1 hr/WC | 18.2 | 17.5 |
| Control Example | | | |
| 1 | 820° C./0.5 hr/OQ + 600° C./1 hr/WC | 9.2 | 2.1 |
| 2 | 1000° C./0.5 hr/OQ + 750° C./1 hr/WC | 8.5 | 1.3 |
| 3 | 1000° C./0.5 hr/OQ + 750° C./1 hr/WC | 15.1 | 4.2 |

All the bonded parts as bonded exhibited torsion breaking torque of 8 kgf·m or higher, which is sufficient for bonding strength of turbine rotor shafts. On the other hand, some of the hardened-tempered samples, in which the liquidus temperatures of the brazing metals were lower than the austenitizing temperatures of the shaft metal, Run Nos. 1–3 of the Control Examples, exhibited significantly lowered strength after the heat treatment.

Example 2

As shown in FIG. 3, whole the shaft part was heated by HF-heating so as to harden it at the same time of brazing. The TiAl turbine wheel, shaft member, brazing filler and the bonding conditions are the same as those of Invention No. 6 in Example 1. The only difference was that quenching was carried out after completion of heating and soaking by blasting argon gas in the space in the cover glass, from the cooling gas nozzles made of heat resistant glass to the shaft member so as to quench it for hardening. The rotors thus manufactured were subjected to torsion test at room temperature and hardness measurement at various location of the shaft part. The hardness measured is shown in Table 4.

TABLE 4

| Distance from Bonded Part (mm) | Surface Layer | Center |
| --- | --- | --- |
| 5 | 57.2 | 54.2 |
| 50 | 56.8 | 53.2 |
| 95 | 57.9 | 54.7 |

Hardness after hardening at various location was, though the data at the center is somewhat lower than those at the surface, HRC 53 or higher, which is sufficient. The torsion breaking torque at room temperature was 17.4 kgf·m, which is the same level of the data in Table 3 of Example 1.

Example 3

The same procedures in Example 1 were repeated to manufacture turbine rotors. TiAl turbine wheels having a diameter of 52 mm were made of 33.5 Al-alloy by precision casting. The shafts were made of a SNCM439 steel rods having a diameter $D_0$=17 mm and length 110 mm. Brazing filler used is a foil of 50 $\mu$m thick made of brazing metal "A" mentioned above. Table 5 shows the shapes and sizes of the turbine rotors and the shafts at the part of bonding.

TABLE 5

| | TiAl Turbine Wheel | | | | Shaft | | | |
| --- | --- | --- | --- | --- | --- | --- | --- | --- |
| No. Shape | H1 | H2 | D1 | D2 | Shape | H1 | H2 | D1 | D2 |
| Invention | Prj.: projecting, Rcs.: recessing | | | | | | | |
| 1 Prj. | — | 1.0 | — | 12.5 | Rcs. | 1.5 | — | 13.0 | — |
| 2 Rcs. | 2.0 | — | 7.0 | — | Prj. | — | 1.0 | — | 6.8 |
| 3 Prj. | — | 1.0 | — | 7.9 | Rcs. | 6.0 | — | 8.0 | — |
| 4 Rcs. | 8.0 | — | 10.0 | — | Prj. | — | 1.0 | — | 9.9 |
| Control Examples | Pln.: plane | | | | | | | |
| 1 Pln. | — | — | — | — | Pln. | — | — | — | — |
| 2 Rcs. | 2.0 | — | 7.0 | — | Prj. | — | 1.0 | — | 4.0 |
| 3 Prj. | — | 1.0 | — | 15.5 | Rcs. | 1.5 | — | 16.0 | — |

Bonding was carried out under HF-heating. Brazing filler was inserted between the surfaces to be bonded, and the upper end of the shaft was pressed down to pose stress of 0.5 kgf/mm$^2$ on the interfaces to be bonded. To keep the atmosphere of the parts to be bonded inert under heating the parts were covered with a heat resistant glass cover and argon gas was supplied to the space in the cover for shielding. Heat by HF-heating was given by a heating coil installed around the glass cover. The parts to be bonded were heated to a temperature of 850° C. and maintained at that temperature for 30 seconds, and then, electric power was shut off for cooling.

Figure 9:
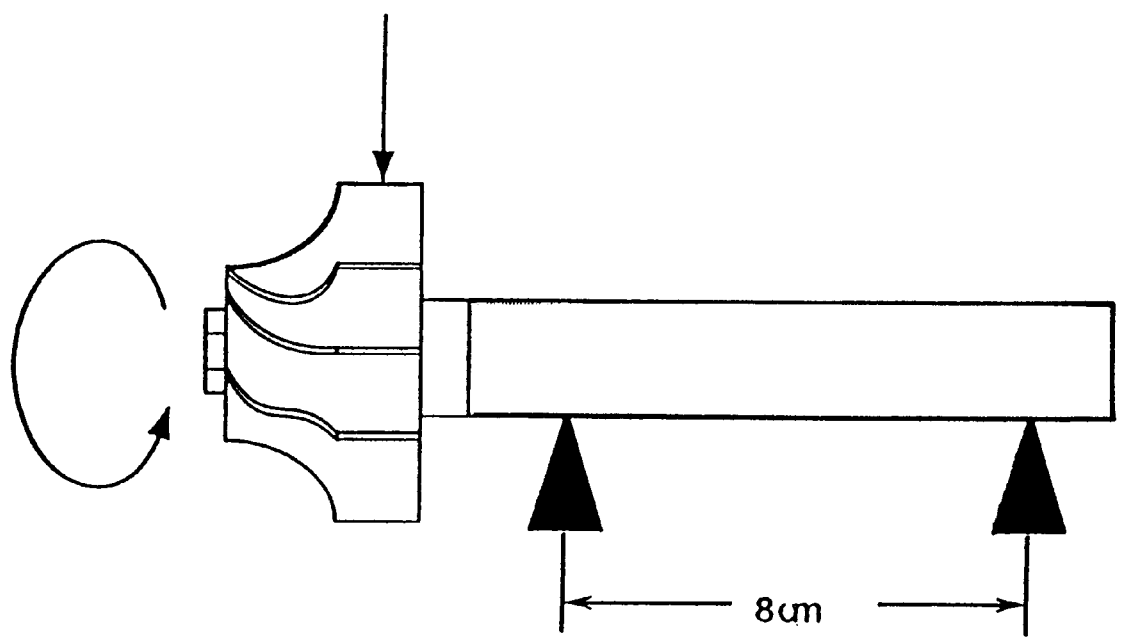
FIG. 9 explains method of measuring "run-out" of axes of the produce turbine rotors.

In order to determine discordance of the axis of the TiAl turbine wheel and the axis of the shaft after bonding the product rotors were rotated with fixed position of the shaft, as shown in FIG. 9, and the maximum values of changes in the outer diameters of the turbine wheels were measured as the "run-out" of the axes. Values of the run-out are averaged values of each three samples. After the measurement, the sample products were subjected to tempering treatment of heating to 600° C. for 30 minutes followed by air cooling. The bonded parts were then subjected to torsion test.

The test results are shown in Table 6 with $D_1^2/D_0^2$ (percentage of the recess in the sectional area at the bonding interface), $D_1-D_2$ (difference in diameters of the projection and the recess) and $H_1-H_2$ (difference of depth of the recess and height of the projection).

TABLE 6

| No. | $D_1{}^2/D_0{}^2$ (mm) | $D_1-D_2$ (mm) | $H_1-H_2$ (mm) | Run-out of Shaft (mm) | Torsion Breaking Torque (mm) |
|---|---|---|---|---|---|
| Invention | | | | | |
| 1 | 0.58 | 0.50 | 0.50 | 0.53 | 11.2 |
| 2 | 0.17 | 0.20 | 1.00 | 0.24 | 13.2 |
| 3 | 0.22 | 0.10 | 5.00 | 0.16 | 14.9 |
| 4 | 0.35 | 0.10 | 7.00 | 0.21 | 13.1 |
| Control Examples | | | | | |
| 1 | — | — | — | 1.10 | 13.9 |
| 2 | 0.17 | 3.00 | 1.00 | 1.31 | 9.2 |
| 3 | 0.89 | 0.50 | 0.50 | 0.36 | 2.3 |

It was found that the run-out of axes of turbine rotors made by fitting projection and recess according to the present invention was much smaller than that of the Control Example No. 1, in which bonded surfaces are plane. The rotor of Control Example Run No. 13, where $D_1{}^2/D_0{}^2 > 0.8$, did not exhibit sufficient torsion breaking torque, because the bonded area was too small. Also, the rotor of Control Example Run No. 3, where $D_1-D_2 > 1.0$ mm, has a large run-out like in the case where the bonded surfaces are plane, due to too large gap of fitting the projection and recess.

Example 4

Using TiAl of the alloy compositions shown in Table 7 TiAl turbine wheels of the same shape and size (diameter 52 mm) were prepared. Shaft material and the brazing metal, alloy compositions thereof being shown also in Table 7, were combined to the above turbine wheels to manufacture turbine rotors. The shaft materials used were SNCM439 and SUH11, which were used also in Example 1. At the bonding part the shafts are projecting with $D_1=8$ mm and $H_1=6$ mm, and the TiAl wheels are recessing with $D_2=7.9$ mm and $H_2=1$ mm.

TABLE 7

| | TiAl Wheel | Shaft | | Brazing Metal | |
|---|---|---|---|---|---|
| No. | Alloy Composition (wt. %) | Steel Code | Austeniti- zing Temp (° C.) | Grade | Liquidus Temp. (° C.) |
| Invention | | | | | |
| 1 | Ti—33.5Al—0.5Cr—1Nb—0.5Si | SNCM439 | 750° C. | BAg—13A | 893° C. |
| 2 | Ti—33.5Al—0.5Cr—1Nb—0.5Si | SNCM439 | 750° C. | A | 820° C. |
| 3 | Ti—33.5Al—0.5Cr—1Nb—0.5Si | SNCM439 | 750° C. | B | 1000° C. |
| 4 | Ti—33.5Al—0.5Cr—1Nb—0.55i | SNCM439 | 750° C. | C | 960° C. |
| 5 | Ti—33.5Al—0.5Cr—1Nb—0.5Si | SNCM439 | 750° C. | BNi-3 | 1040° C. |
| 6 | Ti—34Al—1Cr—5Nb—0.2Si | SUH11 | 850° C. | BNi-3 | 1040° C. |
| Control Example | | | | | |
| 1 | Ti—33.5Al—0.5Cr—1Nb—0.5Si | SNCM439 | 750° C. | BAg-7 | 650° C. |
| 2 | Ti—34Al—1Cr—5Nb—0.2Si | SUH11 | 850° C. | BAg-7 | 650° C. |
| 3 | Ti—34Al—1Cr—5Nb—0.2Si | SUH11 | 850° C. | A | 820° C. |

Bonding was carried out by HF-heating as in Example 1 with the same stress on the interfaces to be bonded, 0.5 kgf/mm². The parts to be bonded were heated to a temperature of liquidus +50° C., soaked at the same temperature for 30 seconds. Then electric power was shut off to cool.

The turbine rotors thus obtained were finished by machining to have a diameter 16 mm at the bonded parts and, as bonded or after being hardened-tempered under the conditions shown in Table 8, subjected to torsion test at room temperature. The results are shown in Table 8.

TABLE 8

| | | Torsion Breaking Torque (kgf•m) | |
|---|---|---|---|
| No. | Hardening-Tempering Condition | As Bonded | As Hardened |
| Invention | | | |
| 1 | 820° C./0.5 hr/OQ + 600° C./1 hr/WC | 11.9 | 11 |
| 2 | 820° C./0.5 hr/OQ + 600° C./1 hr/WC | 12.5 | 13.1 |
| 3 | 820° C./0.5 hr/OQ + 600° C./1 hr/WC | 11.5 | 11.9 |
| 4 | 820° C./0.5 hr/OQ + 600° C./1 hr/WC | 12.8 | 12 |
| 5 | 820° C./0.5 hr/OQ + 600° C./1 hr/WC | 15.6 | 15.1 |
| 6 | 1000° C./0.5 hr/OQ + 750° C./1 hr/WC | 17.5 | 15.5 |
| Control Example | | | |
| 1 | 1000° C./0.5 hr/OQ + 750° C./1 hr/WC | 7.6 | 2.3 |
| 2 | 1000° C./0.5 hr/OQ + 650° C./1 hr/WC | 8.1 | 0.9 |
| 3 | 1000° C./0.5 hr/OQ + 750° C./1 hr/WC | 14.3 | 5.1 |

All the turbine rotors according to the present invention, Invention Run Nos. 1–6, both those as bonded and those hardened-tempered exhibited torsion breaking torque of 10 kgf·m or higher, which is sufficient for bonding strength.

On the other hand, Control Example Run Nos. 1–3 of the hardened-tempered samples, in which the liquidus temperatures of the brazing metals were equal to or lower than the austenitizing temperatures of the shaft metal, exhibited significantly lowered strength after the heat treatment, which are dissatisfactory for turbine rotors.

Example 5

A TiAl turbine wheel and a shaft member the same as used in Example 4, Invention Run No. 5, were bonded using the same brazing filler, and the turbine rotor thus obtained were hardened and tempered. Hardening was done by HF-heating to heat whole the shaft, maintaining at the heating temperature and, after completion of bonding, quenching with argon gas blasted from nozzles for quenching gas made of heat resistant glass.

The rotors thus manufactured were subjected to torsion test at room temperature and hardness measurement at various location of the shaft part. The torsion breaking torque at room temperature was 13.7 kgf·m. Hardness at the surface was HRC 55, which is sufficient.

Example 6

The turbine rotor of Invention, Run No. 3 in Example 3, in which a cavity is formed in the bonded part, and the turbine rotor of Control Example, Run No. 1 of also in Example 3, in which no cavity is formed, were finished by machining to have a diameter at the bonded part $D_0=15$ mm, and the part to be supported by bearings was hardened by HF hardening. Turbochargers were assembled using these turbine rotors and subjected to practical engine tests using a Diesel engine at 4000 rpm for 100 hrs. There was observed color change at shaft part supported by bearing of the rotor of the Control Example Run No. 1 having no cavity. This indicates remarkable temperature increase. On the other hand, no color change was observed at the shaft of the rotor of the Invention Run No. 3 having a cavity. This proves that temperature increase was milder.

We claim:

1. A TiAL turbine rotor consisting of a TiAl turbine wheel made by precision casting and a rotor shaft bonded thereto, wherein the rotor shaft is made of a material selected from the group consisting of a structural steel and a martensitic heat resistant steel, and a base of the wheel is bonded to an end of the shaft are bonded by brazing without using vacuum brazing and frictional bonding.

2. A TiAL turbine rotor consisting of a TiAl turbine wheel made by precision casting and a rotor shaft bonded thereto, wherein the rotor shaft is made of a material selected from the group consisting of a structural steel and a martensitic heat resistant steel, one of a recess and projection is provided concentrically at a base of the wheel and another of the recess and projection is provided concentrically at an end of the shaft, and the recess and projection are fitted together and a ring-shaped part outside the recess and the projection are bonded by high frequency brazing.

3. A TiAl turbine rotor of claim 1, characterized in that the TiAl used for the TiAl turbine wheel has the alloy composition comprising, by weight %, Al:31–35% and the balance substantially of Ti.

4. A TiAl turbine rotor of claim 3, characterized in that the TiAl used for the TiAl turbine wheel has the alloy composition further comprising, by weight %, in addition to the composition of claim 3, at least one of Cr, Mn and V in an amount of 0.2–4.0 wt. % in total.

5. A TiAl turbine rotor of claim 3, characterized in that the TiAl used for the TiAl turbine wheel has the alloy composition further comprising, by weight %, in addition to the composition of claim 3, at least one of Nb, Ta and W in an amount of 0.28.0% in total.

6. A TiAl turbine rotor of claim 3, characterized in that the TiAl used for the TiAl turbine wheel has the alloy composition further comprising, in addition to the composition of claim 3, by weight %, Si: 0.01–1.00%.

7. A TiAl turbine rotor of claim 3, characterized in that the TiAl used for the TiAl turbine wheel which impurities are, by weight %, Zr: less than 1.0%, Fe: less than 1.0%, C: less than 0.2%, O: less than 0.2% and N: less than 0.2%.

8. A TiAl turbine rotor of claim 1, characterized in that the shaft of the rotor is hardened and tempered, and subjected to surface hardening treatment.

9. TiAl turbine rotor of claim 2, characurized in that the TiAl used for the TiAl turbine Wheel has the alloy composition comprising, weight %, Al: 31–35% and the balance substantially of Ti.

10. A TiAl turbine rotor of claim 4, characterized in that the TiAl used for the TiAl turbine wheel has the alloy composition further comprising, by weight %, in addition to the composition of claim 4, at least one of Nb, Ta and W in an amount of 0.2–8.0% in total.

11. A TiAl turbine rotor of claim 4, characterized in that the TiAl used for the TiAl turbine wheel has the alloy composition further comprising, in addition to the composition of claim 4, by weight %, Si: 0.01–1.00%.

12. A TiAl turbine rotor of claim 5, characterized in that the TiAl used for the TiAl turbine wheel has the alloy composition further comprising, in addition to the composition of claim 5, by weight %, Si: 0.01–1.00%.

13. A TiAl turbine rotor of claim 4, characterized in that the TiAl used for the TiAl turbine wheel has the alloy compositions defined in claim 4 in which impurities are, by weight %, Zr: less than 1.0%, Fe: less than 1.0%, C: less than 0.2%, O: less than 0.2% and N: less than 0.2%.

14. The TiAl rotor of claim 1 prepared by the process of:
    abutting the base of a TiAl turbine wheel and the end of the rotor shaft,
    inserting a brazing filler between the butted interfaces,
    applying a stress of at least 0.01 kgf/mm$^2$ but lower than yield stress of the shaft and the rotor wheel at a bonding temperature on the butted interfaces,
    heating the wheel and the shaft by high frequency induction heating in an atmosphere selected from the group consisting of an inert gas and a reducing gas to a brazing temperature higher than the liquidus temperature of the brazing metal but not exceeding 100° C. above the liquidus temperature, and
    maintaining the wheel and the shaft at the brazing temperature to carry out bonding by brazing.

15. The TiAl rotor of claim 1 prepared by the process of:
    processing the base of the turbine wheel and the end of the rotor shaft, so as to form a projection on one of the base of the turbine wheel and the end of the rotor shaft and a recess on another of the base of the turbine wheel and the end of the rotor shaft,
    fitting the projection and the recess together and filling a ring-shaped area around the fitted projection and recess with a brazing filler,
    applying a stress of at least 0.01 kgf/mm$^2$ but lower than yield stress of the shaft and the rotor wheel at a bonding temperature on the butted interfaces,
    heating the wheel and the shaft by high frequency induction heating in an atmosphere selected from the group consisting of an inert gas and a reducing gas to a brazing temperature higher than the liquidus temperature of the brazing metal but not exceeding 100° C. above the liquidus temperature, and
    maintaining the wheel and the shaft at the brazing temperature to carry out bonding by brazing.

16. The TiAl rotor of claim 14, wherein both the turbine wheel and the shaft are brazed by high frequency induction heating to a temperature above the austenitizing temperature of the shaft material, and a cooling gas is applied to the shaft to quench and harden the shaft.

17. The TiAl rotor of claim 14, wherein a brazing metal containing Ag, Ni, Cu or Ti as a main component thereof and having a melting point of 800° C. or higher is used as the brazing filler for bonding.

18. The TiAl rotor of claim 14, wherein the brazing metal and the shaft material are in such a combination that the liquidus temperature of the brazing metal is higher than the austenitizing temperature of the shaft material.

19. The TiAl rotor of claim 15, wherein a gap of up to 1 mm is provided between an inner surface of the recess and an outer surface of projection, and diameters of the projection and the recess are so chosen that the ring-shaped area shares 20% or more of the cross section of the bonded part.

20. The TiAl rotor of claim 15, wherein a depth of the recess is larger than a height of the projection and a cavity having a length of 15 mm or more is formed in the bonded part.

* * * * *